United States Patent [19]

Tanahashi et al.

[11] Patent Number: 4,576,253
[45] Date of Patent: Mar. 18, 1986

[54] VELOCITY CONTROL APPARATUS FOR AN ELEVATOR

[75] Inventors: Tooru Tanahashi, Gifu; Isao Tadenuma, Inazawa, both of Japan

[73] Assignee: Mitsubishi Denki Kabushiki Kaisha, Tokyo, Japan

[21] Appl. No.: 631,303

[22] Filed: Jul. 16, 1984

[30] Foreign Application Priority Data

Jul. 18, 1983 [JP] Japan ................... 58-130711

[51] Int. Cl.³ .............................................. B66B 1/44
[52] U.S. Cl. .............................................. 187/29 R
[58] Field of Search ........................................ 187/29

[56] References Cited

U.S. PATENT DOCUMENTS

| 4,027,745 | 6/1977 | Watanabe | 187/29 |
| 4,030,570 | 6/1977 | Caputo | 187/29 |
| 4,269,286 | 5/1981 | Ishii et al. | 187/29 |
| 4,271,931 | 6/1981 | Watanabe | 187/29 |
| 4,501,343 | 2/1985 | Salihi | 187/29 |

FOREIGN PATENT DOCUMENTS 56-123795 9/1981 Japan .

Primary Examiner—William M. Shoop, Jr.
Assistant Examiner—W. E. Duncanson, Jr.
Attorney, Agent, or Firm—Leydig, Voit & Mayer

[57] ABSTRACT

An inverter, which supplies A.C. power to a motor for driving the cage of an elevator, is feedback-controlled by detecting the A.C. power by means of a detector. The detector provides an output (offset voltage) even when the operation of the inverter is at a stop. The output value fluctuates in accordance with the changes of circumstances such as temperature changes, and the inverter is affected by the fluctuations, so that the inverter generates power with which the motor produces a torque ripple. In order to solve this problem and to perform an operation of reduced torque ripple, the offset voltage of the detector is sensed, and a drive control signal for the inverter is properly changed on the basis of the sensed offset voltage.

11 Claims, 4 Drawing Figures

VELOCITY CONTROL APPARATUS FOR AN ELEVATOR

BACKGROUND OF THE INVENTION

This invention relates to improvements in a velocity control apparatus for an elevator.

FIG. 1 is a circuit diagram which shows an example of a velocity control apparatus for an elevator employing an inverter. Referring to the figure, numeral 1 designates a power source, numeral 2 a main circuit switch (a coil is not shown, and only a contact is shown), numeral 3 a converter which converts alternating current into direct current, numeral 4 a smoothing capacitor which smooths the output voltage of the converter 3, and numeral 5 the inverter which inverts direct current into alternating current. Numerals 6 and 7 designate current detectors which detect the output currents of the inverter 5. Numeral 8 indicates a hoist motor, numeral 9 a velocity detector which is mounted on the hoist motor 8, numeral 10 a sheave winder, numeral 11 a traction rope which connects a cage 12 and a balance weight 13, and numeral 14 a velocity pattern generator. Numeral 15 denotes a velocity calculating circuit which compares the output of the velocity pattern generator 14 with the output of the velocity detector 9 and then provides current commands to current control circuits 16 - 18. These current control circuits 16, 17 and 18 correspond to the U-phase, V-phase and W-phase, respectively.

FIG. 2 shows the details of any of the current control circuits 16, 17 and 18 shown in FIG. 1, all of which have the same arrangements. Referring to the figure, numeral 19 indicates an arithmetic circuit which compares the output 15a of the velocity calculating circuit 15 and the output 6a of the current detector 6 and them amplifies the compared result. This arithmetic circuit 19 is composed of a plurality of resistors and an operational amplifier 19a. An output from the operational amplifier 19a of the arithmetic circuit 19 is pulse-width-modulated by the comparator 20a of a comparison circuit 20, to provide a PWM output, which drives the transistors of the inverter 5 shown in FIG. 1 through a base drive circuit 21.

In such an arrangement, current detectors employing Hall devices are usually used as the current detectors 6 and 7. The current detectors 6 and 7, however, have had the problem that their offset voltages fluctuate due to temperature fluctuations or secular changes. More specifically, even when the bases of the transistors of the inverter 5 are kept cut off, the current detector 6 or 7 provides an output, due to the offset voltage. This offset voltage is not always constant, and it fluctuates. Therefore, the operations of the current control circuits 16, 17 and 18 which operate by receiving the outputs of the current detectors 6 and 7 vary according to the fluctuations of the offset voltages. As a result, D.C. components appear in the output currents of the inverter 5, and the hoist motor 8 generates a torque ripple attributed to the D.C. components. The torque ripple is transmitted to the cage 12 through the sheave 10 as well as the traction rope 11, to give an unpleasant feeling to passengers in the cage 12 disadvantageously.

SUMMARY OF THE INVENTION

This invention has been made in order to eliminate the disadvantage of the prior art described above, and has for its object to provide a velocity control apparatus for an elevator in which the torque ripple of a motor ascribable to the offset voltages of current detectors is reduced, to ovbiate the unpleasant feeling of passengers in the cage.

Another object of this invention is to detect the offset voltages of current detectors and properly vary control signals for an inverter on the basis of the detected values so as to obviate the influence of the offset voltages.

Still another object of this invention is to establish the state in which the detected values of the offset voltages of current detectors are used properly for the control of an inverter.

In order to accomplish such objects, this invention consists in comprising a converter which converts alternating current into direct current, a capacitor which is connected across output terminals of the converter, an inverter which receives an output voltage of the capacitor and which inverts D.C. power into A.C. power so as to drive a hoisting induction motor, current detectors which detect output currents of the inverter, current control circuits which pulse-width-modulate outputs of the current detectors so as to control the inverter, and memory means to detect offset voltages of the current detectors so as to apply compensation inputs to pulse width modulation circuits of the current control circuits.

DESCRIPTION OF THE PREFERRED EMBODIMENTS

Figure 1:
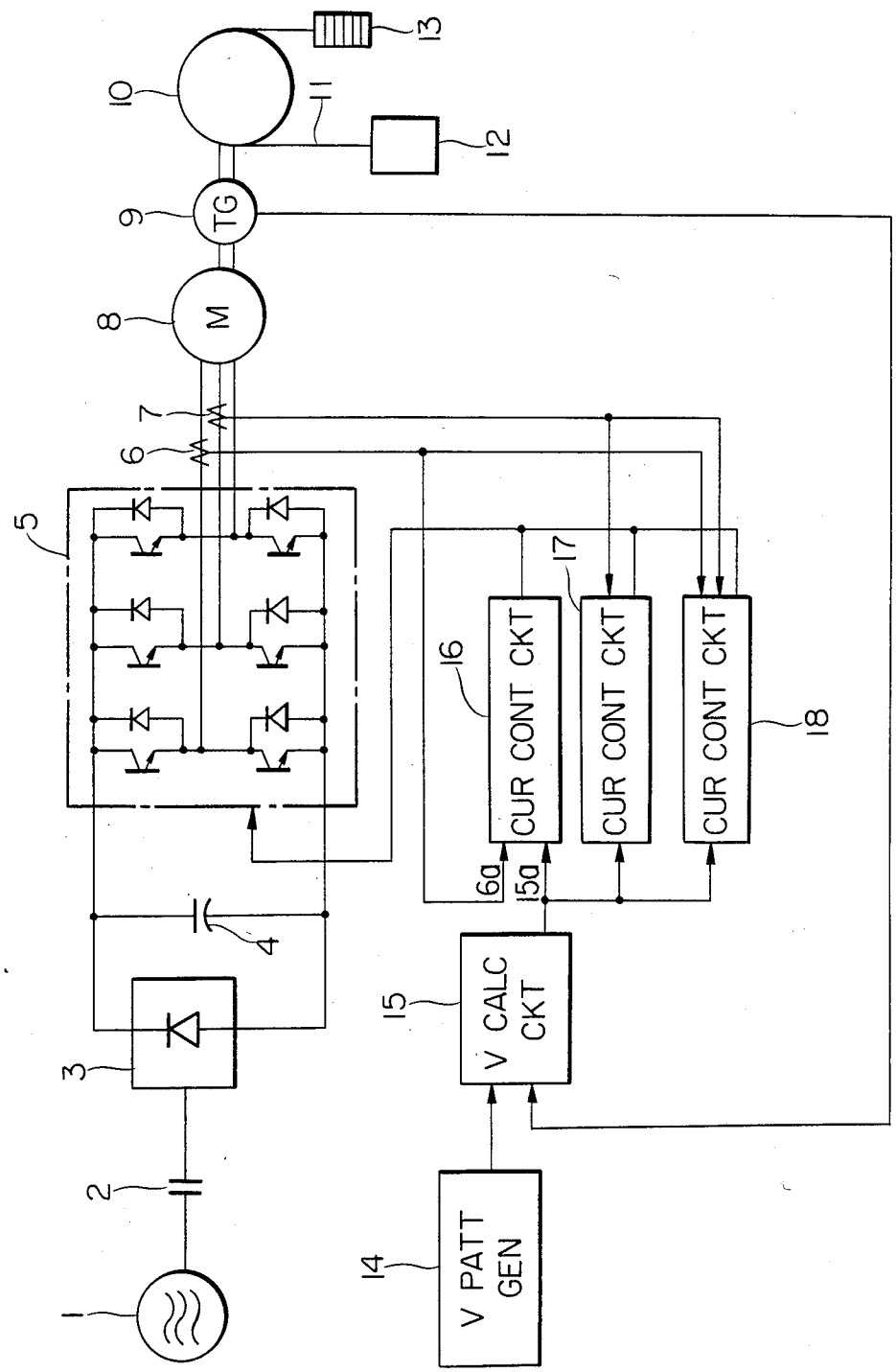
FIG. 1 is a circuit diagram of essential portions showing an example of a prior-art velocity control apparatus for an elevator.

Referring now to the drawings, embodiments of this invention will be described in detail. FIG. 3 is a diagram showing a current control circuit in one embodiment of a velocity control apparatus for an elevator according to this invention. In the figure, the same symbols as in FIG. 2 indicate identical or corresponding portions.

Referring to FIG. 3, numeral 22 indicates a storage circuit. Symbol 22a denotes a contact which is closed when the elevator has stopped to cut off the bases of the transistors of the inverter 5 shown in FIG. 1, symbol 22b a capacitor which stores the output of the arithmetic circuit 19 when the contact 22a has been closed, and symbol 22c a buffer amplifier, the output of which is applied to the operational amplifier 19a of the arithmetic circuit 19. Shown at symbol 22d is a break contact operated with the contact 22a.

In such arrangement, when the elevator has stopped, to keep the bases of the transistors of the inverter 5 cut off, the contact 22a is closed, and the contact 22d is opened. The output 6a or 7a of the current detector 6 or 7 during this period is the offset voltage. Now, letting the gain of the operational amplifier 19a be $-K_i$, the gain of the buffer amplifier 22c be $1/K_i$, and the offset voltage of the current detector 6 or 7 be $e_O$, then the output voltage $V_c$ of the operational amplifier 19a becomes:

$$V_c = -K_i \times e_O$$

This output voltage is stored as the charged voltage of the capacitor 22b. Subsequently, when the base current cutoff of the inverter 5 is released, the contact 22a is opened, and the contact 22d is closed. At this time, the output of the buffer amplifier 22c is applied to the arithmetic circuit 19, and the output of the current detector 6 or 7 can be canceled. In this way, the torque ripple which is produced from the hoist motor 8 by the offset voltage of the current detector 6 or 7 can be suppressed, and a pleasant ride can be attained.

In the elevator, the start and stop thereof are usually repeated frequently, and the running state of the cage is not continued for a long time.

Accordingly, even when the output of the amplifier 19a is stored by the capacitor 22b during the stop of the elevator as in the embodiment, the lowering of the stored voltage attributed to the leakage current of the capacitor 22b is not problematic in practical use. Moreover, since the arrangement is comparatively simple, this embodiment can be fabricated at low cost and is very advantageous in manufacture.

Meanwhile, among elevator systems, there are highclassed ones which require precise motor control. In such elevators, the offset voltage must be stored accurately.

Figure 4:
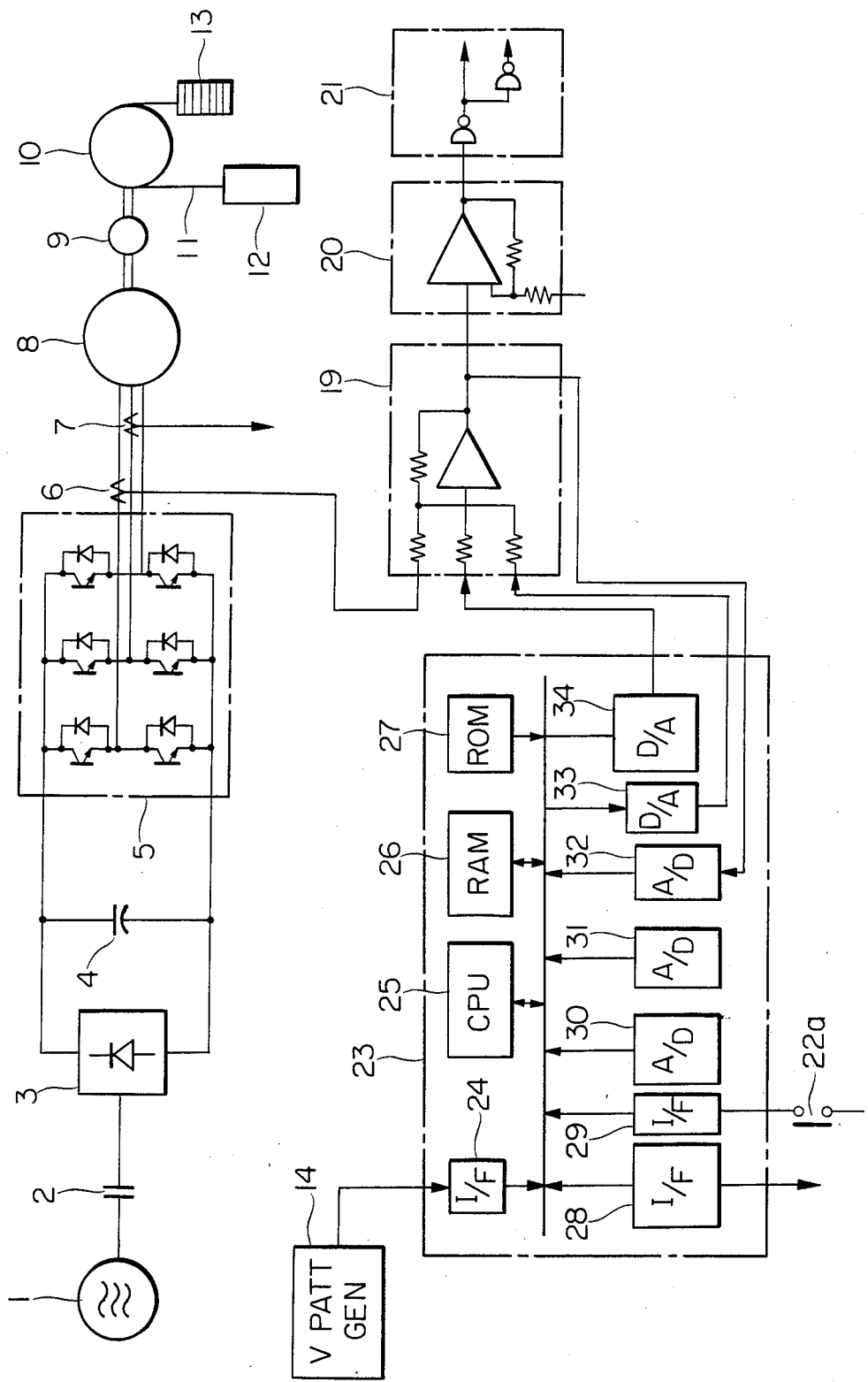
FIG. 4 is a circuit diagram showing another embodiment of the present invention.

FIG. 4 shows another embodiment which has been made for this purpose.

Figure 2:
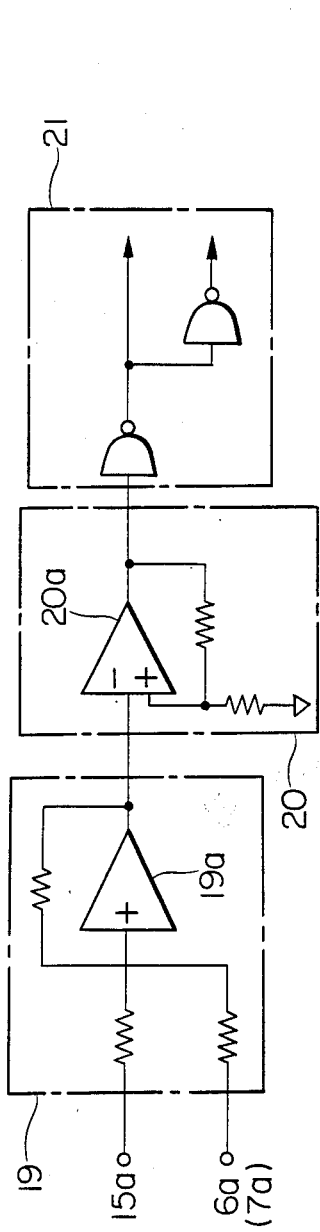
FIG. 2 is a circuit diagram showing the details of a current control circuit in the prior-art velocity control apparatus of FIG. 1.
Figure 3:
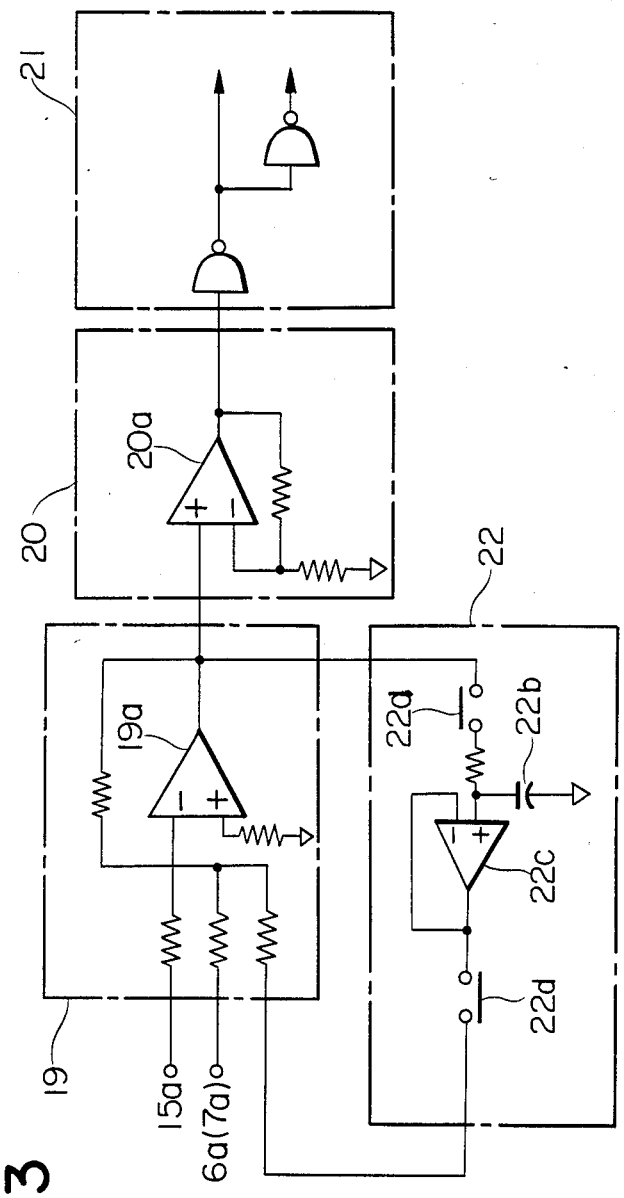
FIG. 3 is a circuit diagram of essential portions showing an embodiment of a velocity control apparatus for an elevator according to the present invention.

In the figure, the same symbols as in FIGS. 1–3 denote identical or corresponding portions.

Referring to FIG. 4, numeral 23 designates a storage device which is constructed of a microcomputer. It comprises an interface 24 for a signal from the velocity pattern generator 14, a central processing unit (CPU) 25 which executes arithmetic processing, a random access memory (RAM) 26 into or from which various data items are written or read out, a read only memory (ROM) 27 in which a program for operating the CPU 25, etc. are stored, an interface 28, an interface 29 which receives the operating state of the contact 22a adapted to open and close in response to the running and stop modes of operation of the cage respectively, A/D converters 30 to 32 which convert analogue signals into digital signals, and D/A converters 33 and 34 which convert digital signals into analogue signals.

In such an arrangement, when the bases of the transistors of the inverter 5 are cut off during the stop mode of the elevator, the contact 22a is closed, and the signals into CPU 25 are fed through the A/D converter 32 from the output of the arithmetic circuit 19 (which is the amplified value of the offset voltage of the current detector 6 or 7) and are stored in the RAM 26. Next, when the cage has started running to release the cutoff of the bases of the transistors of the inverter 5, the contact 22a is opened, and the CPU 25 delivers the output of the arithmetic circuit 19 having been stored in the RAM 26 till then, to the arithmetic circuit 19 through the D/A converter 34. As a result, the output of the current detector 6 is canceled.

Since, in the embodiment of FIG. 3, the offset voltage is stored in the capacitor, it can pose a problem in the highclassed elevator in that the stored voltage lowers due to the leakage current of the capacitor during the running mode of operation. In contrast, the system of FIG. 4 employing the CPU is free from such drawback and has the advantage that the corrected value of the offset voltage can be held constant.

As set forth above, according to this invention, a torque ripple produced in a hoist motor can be reliably suppressed, thereby providing a comfortable ride for passengers in the elevator car.

What is claimed is:

1. A velocity control apparatus for an elevator wherein a motor for running a cage is controlled thereby to perform a velocity control; comprising:
    (a) a converter which converts alternating current fed from a power source, into direct current;
    (b) a capacitor which is connected across D.C. output terminals of said converter and which smooths the D.C. output;
    (c) an inverter which receives the smoothed D.C. output and which inverts it into alternating current so as to supply the A.C. output to said motor;
    (d) a detector which detects the A.C. output of said inverter;
    (e) a control device which delivers a signal for controlling said inverter, while varying it on the basis of the detected output of said detector; and
    (f) a storage device which detects the output of said detector when said inverter is not generating the A.C. output and which sends it to said control device.

2. A velocity control apparatus for an elevator as defined in claim 1, wherein said control device is further supplied with the output of said storage device besides the output of said detector, thereby to cancel the output of said detector in the non-outputting state of said inverter.

3. A velocity control apparatus for an elevator as defined in claim 2, wherein said control device includes an arithmetic device which operates upon receiving the output of said detector and which provides an output for producing a control signal for said inverter, and said storage device detects and stores the output of said arithmetic device.

4. A velocity control apparatus for an elevator as defined in claim 3, wherein said control device has the stored content of said storage device supplied to an input part of said arithmetic device as an input thereof simultaneously with the output of said detector.

5. A velocity control apparatus for an elevator as defined in claim 1, wherein said storage device performs an output operation and a storage operation in interlocking with running and stop of the cage.

6. A velocity control apparatus for an elevator as defined in claim 5, wherein said storage device stores an output of an arithmetic device disposed in said control device during the stop mode of the cage and delivers the stored content so as to supply it as one of the inputs of said arithmetic device during the running mode of the cage.

7. A velocity control apparatus for an elevator as defined in claim 6, wherein a contact which is closed during the stop mode of the cage and opened during the running thereof is disposed between an input portion of said storage device and an output portion of said arithmetic device, and said storage device performs the storage operation during the stop of the cage.

8. A velocity control apparatus for an elevator as defined in claim 7, wherein a contact which is closed during the running mode of the cage and opened during the stop mode thereof is disposed between an output part of said storage device and an input part of said arithmetic device, and said storage device performs the output operation during the running of the cage.

9. A velocity control apparatus for an elevator as defined in claim 6, wherein said storage device includes a capacitor one terminal of which is connected to the output part of said srithmetic device.

10. A velocity control apparatus for an elevator as defined in claim 5, whrein said storage device includes a random access memory.

11. A velocity control apparatus for an elevator as defined in claim 10, wherein said storage device receives an operating state of a contact which is opened and closed in accordance with the stop mode and running mode of the cage, and said random access memory performs a storage operation or an output operation in response to the operating state of said contact.

* * * * *